Feb. 20, 1923.
D. B. DE LANEY
MARKING ATTACHMENT FOR SHEARS
Filed Dec. 8, 1921
1,446,380
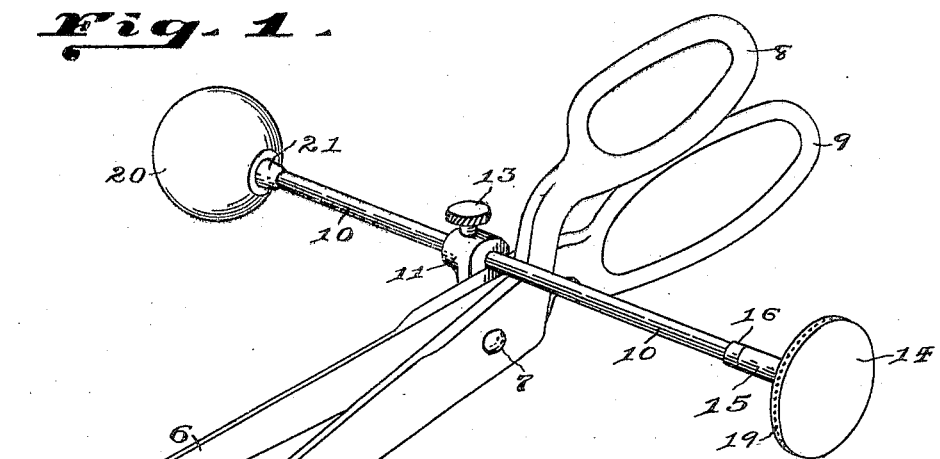
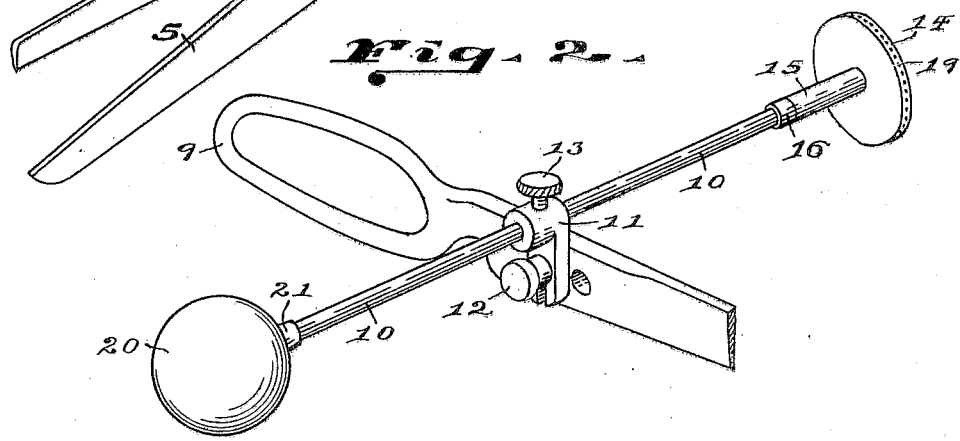
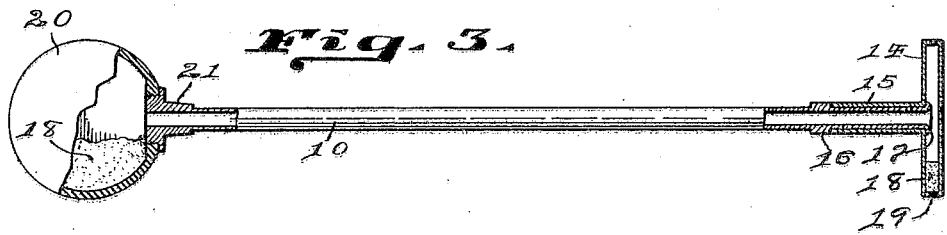
INVENTOR:
Dora B. DeLaney
BY Frank P. Shepard.
ATTORNEY.

Patented Feb. 20, 1923.

1,446,380

UNITED STATES PATENT OFFICE.

DORA B. DE LANEY, OF OKLAHOMA, OKLAHOMA.

MARKING ATTACHMENT FOR SHEARS.

Application filed December 8, 1921. Serial No. 521,060.

*To all whom it may concern:*

Be it known that I, DORA B. DE LANEY, a citizen of the United States, and a resident of Oklahoma city, in the county of Oklahoma and State of Oklahoma, have invented certain Improvements in Marking Attachments for Shears, of which the following is a specification, reference being had to the accompanying drawings.

The object of the invention is to provide a suitable marking attachment for shears.

Figure 1 of the drawings is a perspective of a pair of shears with the improved attachment in place thereon;

Fig. 2 is a similar view in a different direction, showing a fragment of one blade of the shears with the attachment in place thereon; and Fig. 3 is a front elevation of a portion of the attachment, with parts at the ends of the figure in section.

Referring to the several figures, in all of which like characters of reference designate like parts, the shears shown in this instance includes the lower blade 5 and the upper blade 6 which is pivoted to said blade 5 by the usual screw or rivet 7; the rear ends of the blades being formed into the usual handholds 8 and 9, respectively.

The attachment includes a shaft 10 which is mounted above the pivotal point of the shears and projects out laterally on each side thereof, this shaft passing through a supporting bearing 11 which is removably clamped to the upper blade 6 by a screw 12.

A set-screw 13 releasably clamps the shaft 10 in the bearing 11.

On one end of the shaft 10, preferably the left-hand end, a hollow disk 14 is pivoted, and this disk is provided with a long hub or sleeve 15 which revolubly embraces said shaft.

A fixed collar 16 on the shaft 10 keeps the disk 14 from sliding toward the shears, and the extreme outer end of the shaft is flanged or swaged inside the disk, as at 17, to keep said disk from sliding off the shaft.

A supply of marking powder 18 is placed in the disk 14 so that when said disk is revolved by contact with cloth or other material that is being cut by the shears said powder slowly sprinkles out of the disk through the perforated edge wall 19.

A line of the powder 18, parallel with the line of cut of the shears, is thus left on the cloth or other material as line to accurately indicate the next cutting line.

In order to readily and conveniently supply the disk 14 with powder 18, the shaft 10 is made tubular and provided at its end opposite the disk with a supply receptacle 20.

That portion 21 of the receptacle 20 to which the shaft 10 attaches is removably screw-threaded to the remainder of the receptacle to allow the latter to be refilled.

When it is desired to fill the disk 14 from the receptacle 20, the shears may be lifted up and turned over to the left to bring the shaft 10 toward a vertical position; then, by jarring the shears or the shaft a little the powder 18 will slide down through into the disk.

The following is claimed:—

In combination with the two blades of a shears, a suitable supporting bearing carried by one of the blades of the shears, a hollow shaft extending slidably through the bearing, means for locking the shaft against sliding movement in the bearing, a hollow disk pivoted to one end of the shaft and having its interior in communication with the shaft, the disk being adapted to be revolved by contact with the material being sheared and having outlet openings in its edge wall, the opposite end of the shaft carrying a receptacle to contain powder and being so arranged that the powder can be shaken from it through the bore of the shaft to the disk.

Witness my hand this 23rd day of November, 1921.

DORA B. DE LANEY.